(12) United States Patent
Kress (10) Patent No.: US 7,701,618 B2
(45) Date of Patent: Apr. 20, 2010

(54) AUTOMATIC IMAGE ENHANCEMENT USING COMPUTED PREDICTORS

(75) Inventor: William C. Kress, Mission Viejo, CA (US)

(73) Assignees: Kabushiki Kaisha Toshiba (JP); Toshiba Tec Kabushiki Kaisha (JP)

( * ) Notice: Subject to any disclaimer, the term of this patent is extended or adjusted under 35 U.S.C. 154(b) by 768 days.

(21) Appl. No.: 11/465,588

(22) Filed: Aug. 18, 2006

(65) Prior Publication Data

US 2007/0291317 A1 Dec. 20, 2007

Related U.S. Application Data

(63) Continuation-in-part of application No. 11/453,182, filed on Jun. 14, 2006, now abandoned.

(51) Int. Cl.
*G06K 9/34* (2006.01)
*H04N 1/38* (2006.01)
(52) U.S. Cl. .................. 358/464; 358/3.27; 382/171
(58) Field of Classification Search ............... 358/3.27, 358/1.9, 3.15, 3.21, 3.24, 3.26, 464, 522; 382/168, 171, 172, 266, 269, 278
See application file for complete search history.

(56) References Cited

U.S. PATENT DOCUMENTS

| 6,674,899 | B2 * | 1/2004 | Nagarajan et al. | 382/168 |
| 6,856,704 | B1 * | 2/2005 | Gallagher et al. | 382/263 |
| 7,440,593 | B1 * | 10/2008 | Steinberg et al. | 382/118 |
| 7,620,266 | B2 * | 11/2009 | Brown et al. | 382/278 |
| 2006/0002615 | A1 * | 1/2006 | Fu et al. | 382/254 |
| 2006/0232823 | A1 * | 10/2006 | Hooper | 358/3.27 |

FOREIGN PATENT DOCUMENTS

EP 1049045 A1 * 11/2000

\* cited by examiner

*Primary Examiner*—James A Thompson
(74) *Attorney, Agent, or Firm*—Tucker Ellis & West LLP (57) ABSTRACT

A method and apparatus for enhancing electronic images allows for improved characteristics between light areas and dark areas, and is particularly effective for backlit images. A transition between light and dark image portions is detected. A determination is made from an analysis of spectral distributions as to whether an image portion is backlit. Upon detection, image data is adjusted to lighten or darken image portions to allow for improved image viewing. Use of cumulative probability distribution data associated with an electronic image facilitates isolation of backlit image portions and object image portions.

17 Claims, 8 Drawing Sheets

AUTOMATIC IMAGE ENHANCEMENT USING COMPUTED PREDICTORS

This application is a Continuation-In-Part of U.S. patent application Ser. No. 11/453,182, filed Jun. 14, 2006, now abandoned under Express Mail Label No. EV 515354723 US.

BACKGROUND OF THE INVENTION

The subject application is directly broadly to image enhancement, and is particularly applicable to captured images of backlit specimens. However, it will be appreciated that the concepts disclosed herein are particularly applicable to any image enhancement wherein two or more portions of captured image have distinct lighting, brightness, or contrast characteristics.

Electronically encoded images are ubiquitous. Today, such images may be captured directly from a device, such as a digital still camera or digital video recorder, scanned in from other media, such as photographs, captured from streaming media, such as a live television feed, or consist of one or more previously obtained images retrieved from storage, such as from numerically encoded image archives. Many such images were either captured under less-than-ideal conditions, or with equipment that rendered a resulting image less than optimal due to variations in lighting or other properties on various aspects of a captured image. One example is images that are taken in a backlit setting. Such a situation may result when a bright sky, direct sunlight, or any other relatively intense background illumination source is situated behind an object of interest, such as a building, person or landscape feature. The background illumination in such a situation is sufficiently intense that detail or resolution of the foreground image or object, the backlit image portion, or both is compromised. Earlier approaches to address such concerns have been made algorithmically, electrically, via signal processing or mechanically (such as through filtration, f-stop, aperture size, and the like during image capture). However, earlier systems focused on capture or processing of an image as a whole, such that attempts to address concerns for one portion of an image would adversely impact other aspects of the image.

Captured or stored images are typically stored in an encoded format, such as digitally, which encoding is often done in connection with component values of a primary color space. Such color components are suitably additive in nature, such as red-green-blue (RGB), or subtractive, such as cyan, yellow, magenta (CYM), the latter of which is frequently coupled with a black color (K), referred to as CYMK or CYM(K). Additive primary color space descriptions are generally associated with images displayed on light generating devices, such as monitors or projectors. Subtractive primary color space descriptions are generally associated with images generated on non-light generating devices, such as paper printouts. In order to move an image from a display to a fixed medium, such as paper, a conversion must be made between color spaces associated with electronic encoding of documents.

The concepts disclosed herein are better appreciated with an understanding of various numeric models used to represent images, and image colorization, in image processing or rendering applications. One of the first mathematically defined color spaces was the CIE XYZ color space (also known as CIE 1931 color space), created by CIE in 1931. A human eye has receptors for short (S), middle (M), and long (L) wavelengths, also known as blue, green, and red receptors. One need only generate three parameters to describe a color sensation. A specific method for associating three numbers (or tristimulus values) with each color is called a color space, of which the CIE XYZ color space is one of many such spaces. The CIE XYZ color space is based on direct measurements of the human eye, and serves as the basis from which many other color spaces are defined.

In the CIE XYZ color space, tristimulus values are not the S, M and L stimuli of the human eye, but rather a set of tristimulus values called X, Y, and Z, which are also roughly red, green and blue, respectively. Two light sources may be made up of different mixtures of various colors, and yet have the same color (metamerism). If two light sources have the same apparent color, then they will have the same tristimulus values irrespective of what mixture of light was used to produce them.

CIE L*a*b* (CIELAB or Lab) is frequently thought of as one of the most complete color models. It is used conventionally to describe all the colors visible to the human eye. It was developed for this specific purpose by the International Commission on Illumination (Commission Internationale d'Eclairage, resulting in the acronym CIE). The three parameters (L, a, b) in the model represent the luminance of the color (L: L=0 yields black and L=100 indicates white), its position between red and green (a: negative values indicate green, while positive values indicate red), and its position between yellow and blue (b: negative values indicate blue and positive values indicate yellow).

The Lab color model has been created to serve as a device independent reference model. It is therefore important to realize that visual representations of the full gamut (available range) of colors in this model are not perfectly accurate, but are used to conceptualize a color space. Since the Lab model is three dimensional, it is represented properly in a three dimensional space. A useful feature of the model is that the first parameter is extremely intuitive: changing its value is like changing the brightness setting in a TV set. Therefore only a few representations of some horizontal "slices" in the model are enough to conceptually visualize the whole gamut, wherein the luminance is suitably represented on a vertical axis.

The Lab model is inherently parameterized correctly. Accordingly, no specific color spaces based on this model are required. CIE 1976 L*a*b* or Lab mode is based directly on the CIE 1931 XYZ color space, which sought to define perceptibility of color differences. Circular representations in Lab space correspond to ellipses in XYZ space. Non-linear relations for L*, a*, and b* are related to a cube root, and are intended to mimic the logarithmic response of the eye. Coloring information is referred to the color of the white point of the system.

Electronic documents, such as documents that describe color images, are typically encoded in one or more standard formats. While there are many such formats, representative descriptions currently include Microsoft Word file (*.doc), tagged information file format ("TIFF"), graphic image format ("GIF"), portable document format ("PDF"), Adobe Systems' PostScript, hypertext markup language ("HTML"), extensible markup language ("XML"), drawing exchange files (*.dxf), drawing files (*.dwg), Paintbrush files (*.pcx), Joint Photographic Expert Group ("JPEG"), as well as a myriad of other bitmapped, encoded, compressed or vector file formats.

It would be advantageous to have a system and method that allowed for ready conversion of any such encoded images to address loss of image quality associated with portions of an image being subject to different illumination or lighting characteristics.

SUMMARY OF THE INVENTION

In accordance with the subject application, there is provided a system and method for image enhancement.

Further, in accordance with the subject application, there is provided a system and method for image enhancement wherein two or more portions of captured image have distinct lighting, brightness, or contrast characteristics.

Still further, in accordance with the subject application, there is provided a system and method that allows for ready conversion of any such encoded images to address loss of image quality associated with portions of an image being subject to different illumination or lighting characteristics.

Still further, in accordance with the subject application, there is provided a system for predictor-based image enhancement. The system comprises means adapted for receiving image data, the image data including data representative of a backlit image inclusive of at least one specimen area and at least one background area. The system further comprises transition detection means adapted for determining, from received image data, a transition between the at least one specimen area and the at least one background area. The system also comprises adjustment means adapted for adjusting a parameter of image data associated with at least one of the specimen area and the background area in accordance with a determined transition.

In one embodiment, the adjustment means includes means adapted for adjusting a lighting level associated with at least one of image data of the specimen area and image data of the background area. In another embodiment, the adjustment means includes means adapted for increasing a lighting level associated with image date of the specimen area and decreasing a lighting level associated with image data of the background area.

In a further embodiment, the system further comprises determining means adapted for determining spectral frequency data representative of a spectral frequency distribution of color data included in the image data. In addition, the adjustment means includes means adapted for adjusting the lighting level associated with at least one of image data of the specimen area and image data of the background area in accordance with the spectral frequency data. Preferably, the spectral frequency data includes distribution data representative of a cumulative probability distribution of intensity values encoded in the image data.

In yet another embodiment, the system also comprises mask generator means adapted for generating mask data corresponding to a determined transition. In this embodiment, the adjustment means includes means adapted for selectively adjusting a parameter of image data associated with at least one of the specimen area and the background area in accordance with a determined transition in accordance with the mask data. Preferably, the mask data corresponds to at least one portion of an image represented by the image data, which at least one portion defines a shape having no significant holes or discontinuities.

Still further, in accordance with the subject application, there is provided a method for predictor-based image enhancement in accordance with the system described above.

Still other advantages, aspects and features of the subject application will become readily apparent to those skilled in the art from the following description wherein there is shown and described a preferred embodiment of this subject application, simply by way of illustration of one of the best modes best suited to carry out the subject application. As it will be realized, the subject application is capable of other different embodiments and its several details are capable of modifications in various obvious aspects all without departing from the scope of the subject application. Accordingly, the drawings and descriptions will be regarded as illustrative in nature and not as restrictive.

DETAILED DESCRIPTION

The subject image enhancement system advantageously works by analysis and manipulation of numerically encoded image data, such as digitally encoded picture data associated with the many such sources noted above. For purposes of illustration, digital images are referenced which are encoded in commonly-used RGB color space, as is typically encountered in image capture devices or digital image processing devices. However, it is to be appreciated that the teachings herein are suitably applied to any encoded image, in any primary color scheme or in grayscale. Further, the subject system is suitably implemented on any suitable computer platform, and will be described in conjunction with a general purpose digital computing device such as a workstation. However, as noted in more detail below, the subject system suitably resides on a digital imaging device, a controller of a document processing device, or implemented directly in an image capture device, such as a digital camera, which device incorporates ability do perform the analysis and calculations noted herein.

Figure 1:
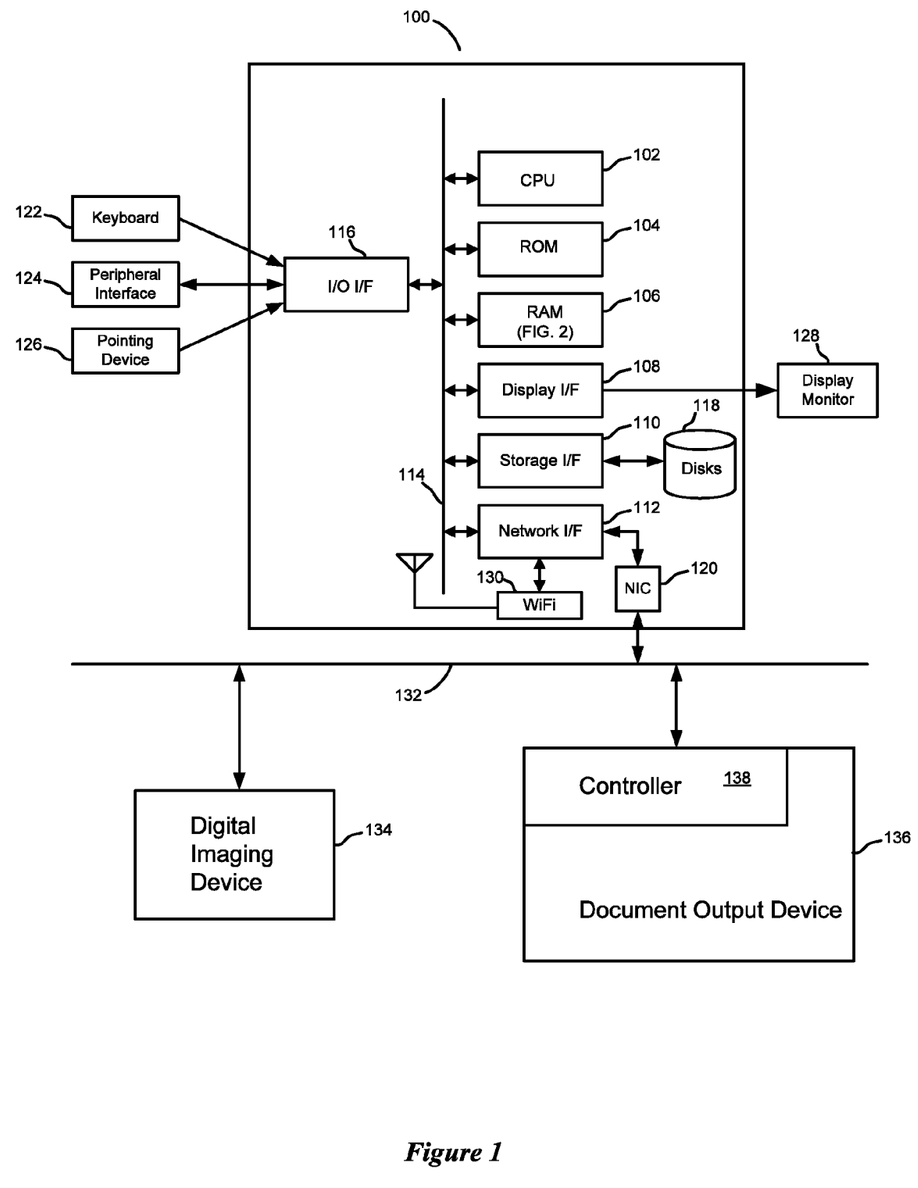
FIG. 1 illustrates representative platforms for performing image enhancement in connection with the subject application.

Turning now to FIG. 1, illustrated is a hardware diagram of a suitable computer or workstation 100 for use in connection with the subject system. A suitable workstation includes a processor unit 102 which is advantageously placed in data communication with a data storage, which data storage suitably includes read only memory 104, non-volatile read only memory, volatile read only memory or a combination thereof, random access memory 106, display interface 108, storage interface 110, and network interface 112. In a preferred embodiment, interface to the foregoing modules is suitably accomplished via a bus 114. As will be seen below, the subject functionality is suitably implemented via instructions read from storage, typically being run from random access memory 106, as will be appreciated by one of ordinary skill in the art, and the detail of which follows below.

Read only memory 104 suitably includes firmware, such as static data or fixed instructions, such as BIOS, system functions, configuration data, and other routines used for operation of the workstation 100 via CPU 102.

Random access memory 106 provides a storage area for data and instructions associated with applications and data handling accomplished by processor 102.

Display interface 108 receives data or instructions from other components on bus 114, which data is specific to generating a display to facilitate a user interface. Display interface 108 suitably provides output to a display terminal 128, suitably a video display device such as a monitor, LCD, plasma, or any other suitable visual output device as will be appreciated by one of ordinary skill in the art.

Storage interface 110 suitably provides a mechanism for non-volatile, bulk or long term storage of data or instructions in the workstation 100. Storage interface 110 suitably uses a storage mechanism, such as storage 118, suitably comprised of a disk, tape, CD, DVD, or other relatively higher capacity addressable or serial storage medium.

Network interface 112 suitably communicates to at least one other network interface, shown as network interface 120, such as a network interface card. It will be appreciated that by one or ordinary skill in the art that a suitable network interface is comprised of both physical and protocol layers and is suitably any wired system, such as Ethernet, token ring, or any other wide area or local area network communication system, or wireless system, such as WiFi, WiMax, or any other suitable wireless network system, as will be appreciated by on of ordinary skill in the art.

An input/output interface 116 in data communication with bus 114 is suitably connected with an input device 122, such as a keyboard or the like. Input/output interface 116 also suitably provides data output to a peripheral interface 124, such as a USB, universal serial bus output, SCSI, Firewire (IEEE 1394) output, or any other interface as may be appropriate for a selected application. Finally, input/output interface 116 is suitably in data communication with a pointing device interface 128 for connection with devices, such as a mouse, light pen, touch screen, or the like.

In the illustration of FIG. 1, a network interface, such as network interface card 120, places the network interface 112 in data communication with network 132. Also in data communication with the network 132 in the illustration is a digital imaging device 134, and a document output device 136 that advantageously includes a controller 138. It will be appreciated, as noted above, that devices such as digital imaging device 134, as well as intelligent output devices, such as printers, copiers, facsimile machines, scanners, or combinations thereof, frequently employ intelligent controllers, such as is illustrated. It will be appreciated that any such device suitably includes sufficient capability to complete the image enhancement disclosed herein. Alternatively enhancement functions are suitably distributed between a plurality of intelligent devices placed in relative data communication to one another.

Figure 2:
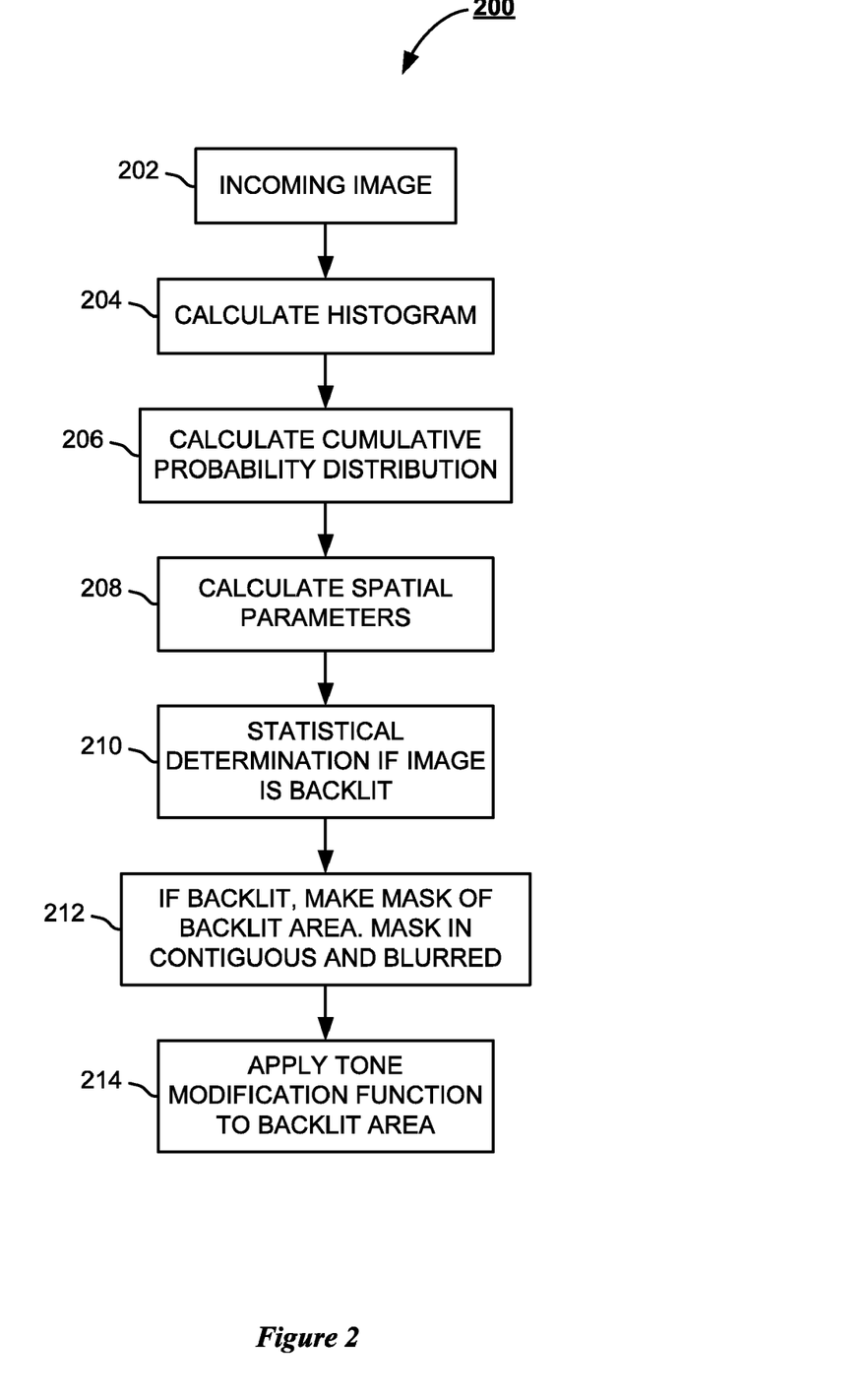
FIG. 2 is a flow chart for performing the image enhancement of the subject application.

Turning now to FIG. 2, illustrated is a flow chart of an image enhancement operation 200 of the subject application, suitably implement from instructions and data associated with the workstation of FIG. 1. First, at block 202, an incoming image is received via any suitable means known in the art. As noted above, the incoming image is suitably any electronic document, such as a digitally encoded image from one or more of the plurality of sources noted above. Next, at block 204, data of the incoming image is analyzed relative to frequency information associated with the encoded data. In the preferred embodiment, a histogram is generated from this analysis, the particulars of which will be detailed below.

Next, in FIG. 2, at block 206, a cumulative probability distribution function is calculated forming a histogram for spectral or image content analysis completed at block 204. Next, at block 208, spatial parameters, that is, characteristics as to distinctive areas associated with the image, are calculated. A statistical determination is then made of a received image to determine if it is backlit at 210. Upon a determination that an image is backlit, block 212 accomplishes a construction or identification of a mask area of one or more backlit image portion. The mask is suitably contiguous and blurred in a backlit image of the preferred embodiment. While a backlit area mask is used in a preferred embodiment, it will be appreciated that a mask is suitably either the backlit area or frontal image area, with appropriate algorithmic adjustments made according to which mask is chosen. Next, at block 214, a tone modification function is applied to the backlit area in the preferred embodiment to result in an enhanced image output.

Image enhancement as noted above is suitably accomplished on metadata that is often attached to an encoded image. However, it will be appreciated that such corrections are also suitably calculated directly from image data. Devices, such as digital cameras, often include encoded images inclusive of metadata. Images from digital capture devices, such as digital cameras, are particularly problematic for image acquisition insofar backlit situations are either unavoidable, or not contemplated by novice photographers.

The foregoing system accomplishes image enhancement by calculation of parameters associated with an image, as well as spatially constrained changes that are made in tone scale rendering. The actual modifications are made, in the preferred embodiment, by use of cumulative probability distribution and spatial predictors. Additionally, it will be appreciated that if only one portion of an image suffers from tone scale problems, such as a sky in a backlit photograph, only this portion need be addressed to allow for significant improvement in overall image quality. Complementary image portions are suitably left unaltered, or subject to image enhancement independently in a fashion appropriate for each portion. This is to be contrasted with earlier systems which typically attempt to apply methods or algorithms to an entire image. Such algorithms may manipulate or adjust portions of an image that are otherwise acceptable, resulting in degradation as to those portions.

Figure 3A:
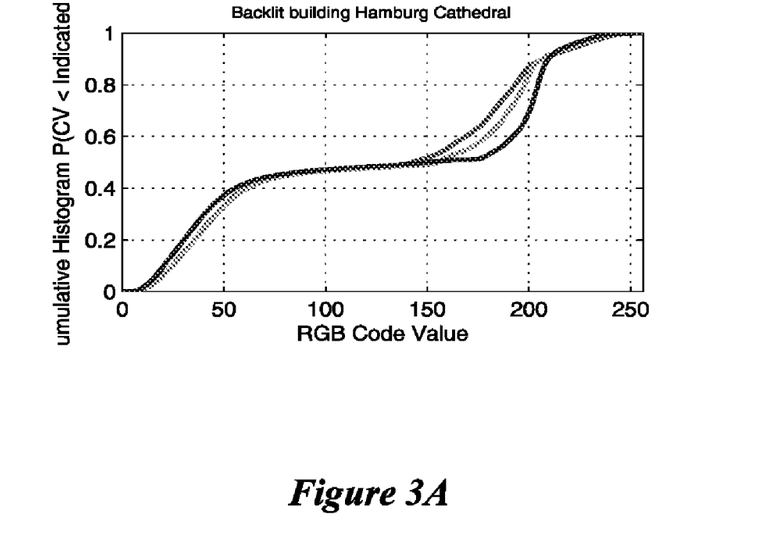
FIGS. 3A and 3B illustrate graphically spectral frequency data associated with an input for backlit images.
Figure 3B:
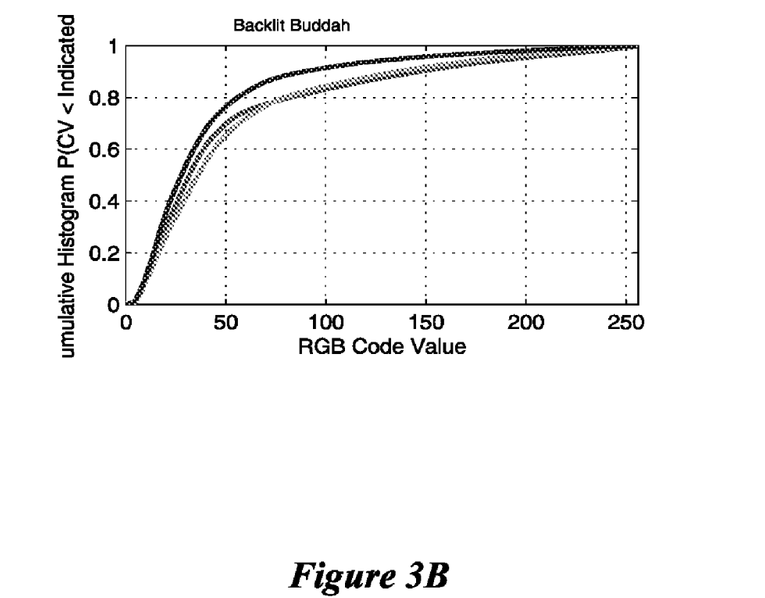

Turning now to FIG. 3, illustrated is a methodology of spectral frequency analysis used in conjunction with the teachings of the subject application. A cumulative property distribution of intensities associated with image pixels advantageously provides an indicator of a degree of backlighting from a corresponding electronic image. On a backlit image, a cumulative property distribution rises more rapidly at first than with a well lit image. Additionally, there is often a flattening in a mid-scale range associated with the distribution. As noted above, a representative encoding is in connection with red-green-blue or RGB color space, which encoding is reflected in the representative graphs of FIG. 3, as well as those of FIGS. 4 and 8 as will be addressed below.

FIGS. 3A and 3B illustrate histograms of two sample images for which back lighting is present. The graphs of FIGS. 3A and 3B will be understood to be representative graphs only, and are given as illustrative of backlit image properties associated with the subject application. In the subject examples, 8 bits are used for encoding each of red, green and blue of the RGB encoding, each component of which is reflected in its own curve. Such 8-bit encoding allows for 256 (0-255) levels for each of the three additive primary colors. In the graphs, the abscissa values are those associated with each of the red, green and blue values. The ordinate values are a cumulative histogram associated with RGB values wherein the ordinate values represent a probability which is a function of a coefficient of variation which is less than an indicated corresponding RGB code value.

Figure 4A:
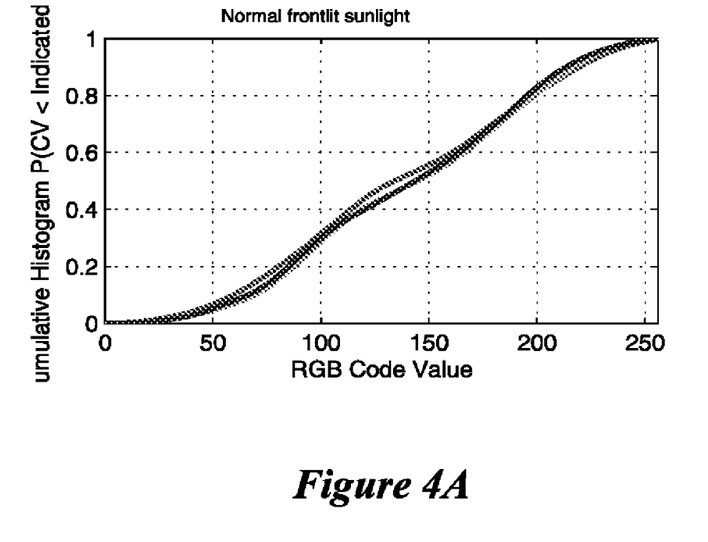
FIGS. 4A and 4B illustrate graphically spectral frequency data associated with an input for frontlit images.
Figure 4B:
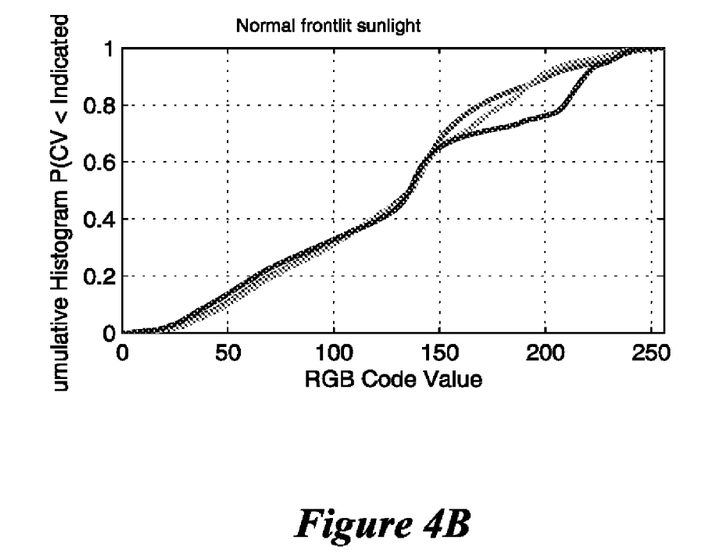

In the example of FIG. 3A, an associated image was that of a Hamburg cathedral which appears below in connection with FIGS. 5-7. It will be noted that the graphs here exhibit a rapid rise, flattening and subsequent resume rise which, as noted, above, is indicative of a back lighting. The example of FIG. 3B is that of a backlit Buddha image which also shows an initial fast rise, followed by a subsequent flattening. In this example, it will be noted that no second rapidly rising area is present in the curves. Turning to FIG. 4, corresponding representations of a normal, front lit image are presented with a similar graphical format. In these instances, it will be noted in both FIGS. 4A and 4B that the trend for a quick rise and subsequent flattening noted in connection with the graphs of FIG. 3, are not found in either instance. Thus, the cumulative property distribution will be noted to provide a mechanism by which front lighting and back lighting may be readily detected.

Another consideration is an area of interest from which a cumulative probability distribution is taken and a relative distribution of code values in different areas. By way of example, if one assumes statistically that most people take pictures with the principle subject in the center, then a center-weighted cumulative probability distribution becomes of interest. If it is a situation, such as a back-lit situation, then typically an upper portion of an image should have much higher code values than a center area or a bottom area.

Figure 5:
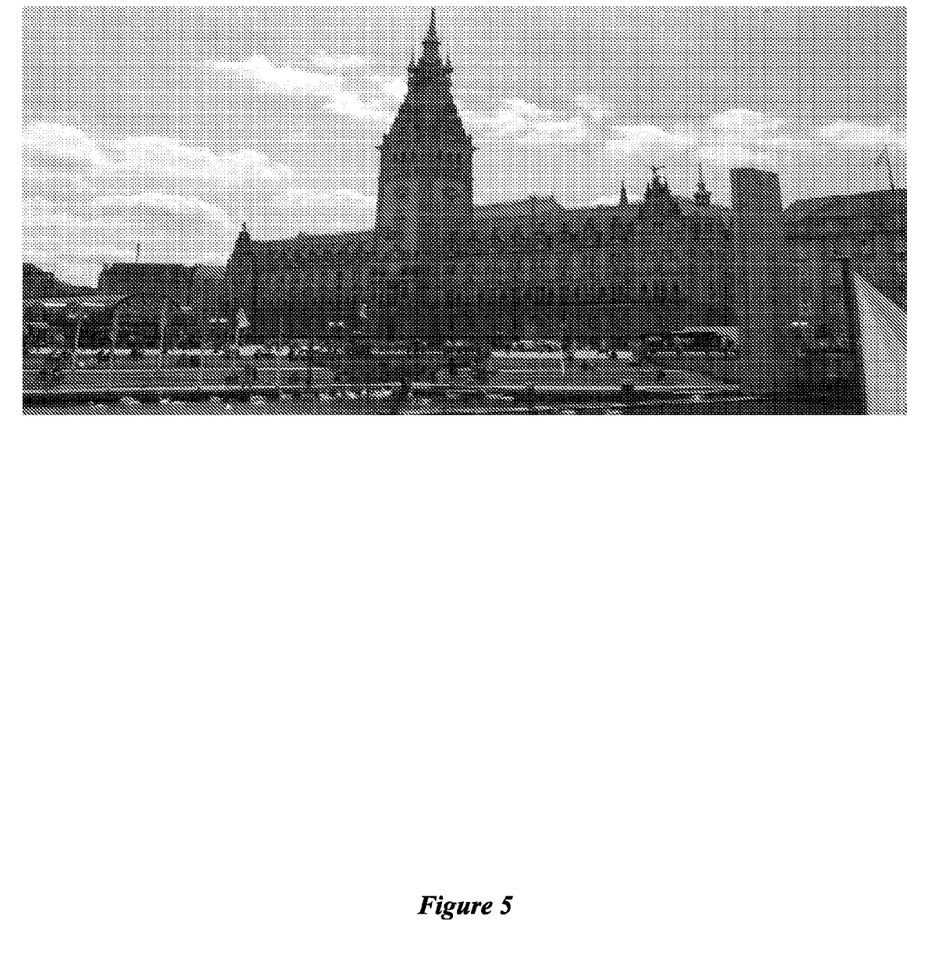
FIG. 5 illustrates an output associated with a normal backlit image.

Turning to FIG. 5, illustrated is a representative picture of the Hamburg cathedral shown, referred to graphically above, wherein back lighting is present. In the preferred embodiment, an operation is made to identify a darker image portion as a continuous blob. A blob is defined herein as a shape without significant holes or discontinuities associated with it, typically in the center of a picture or images frame. As noted above, in connection with FIG. 2, in the preferred embodiment, a mask is suitably made from this blob and values are used to change code values within the mask area in the preferred embodiment. In the event that a blob has discontinuities, a straightforward operation is suitably used to fill in any such discontinuity so as to arrive at continuous blob area for application of image enhancement.

Figure 6:
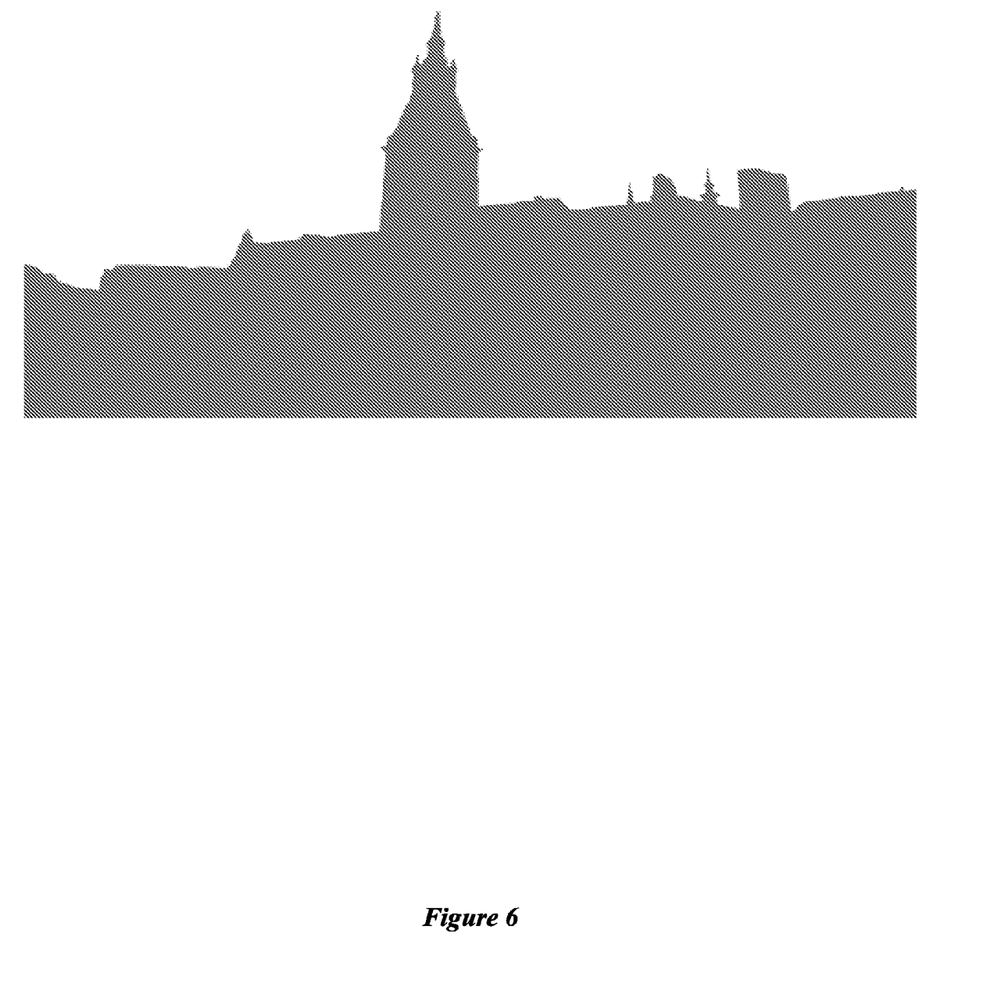
FIG. 6 illustrates a mask isolating portions of the image of FIG. 5.

FIG. 6 illustrates a suitable mask area that corresponds with the image of FIG. 5. As noted above, code values outside an identifier mask area are also suitably altered, such as by darkening, to improve a view of the background image portion. Application of lightning of the foregoing image, darkening of the background or backlit portion of the image, or a combination thereof, is illustrated in connection with FIG. 7. Algorithms associated with lightening or darkening of images or portions thereof are well understood by one of ordinary skill in the art. When compared to the image of FIG. 5, it will be appreciated that the image of FIG. 7 is significantly improved in detail by virtue of application of the subject system.

Figure 7:
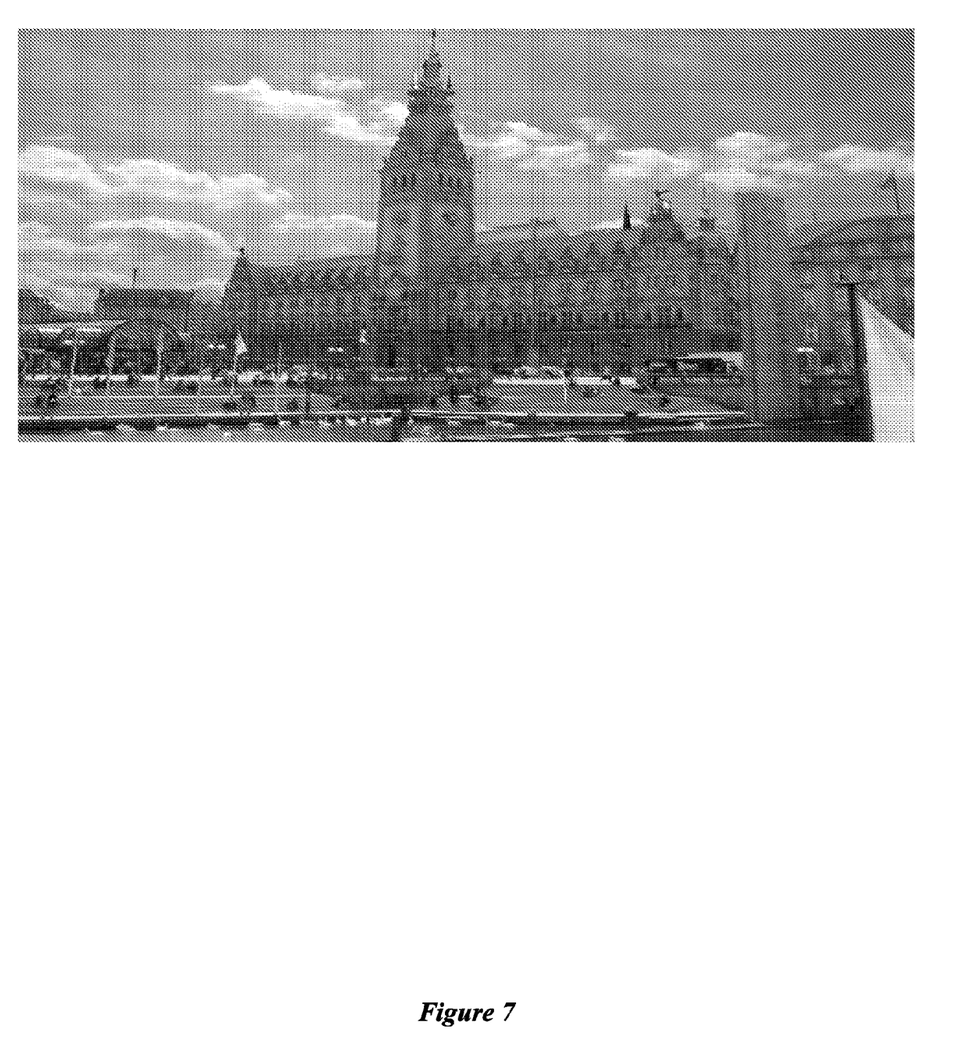
FIG. 7 illustrates an enhancement to the image of FIG. 5 after application of teachings of the subject application.
Figure 8:
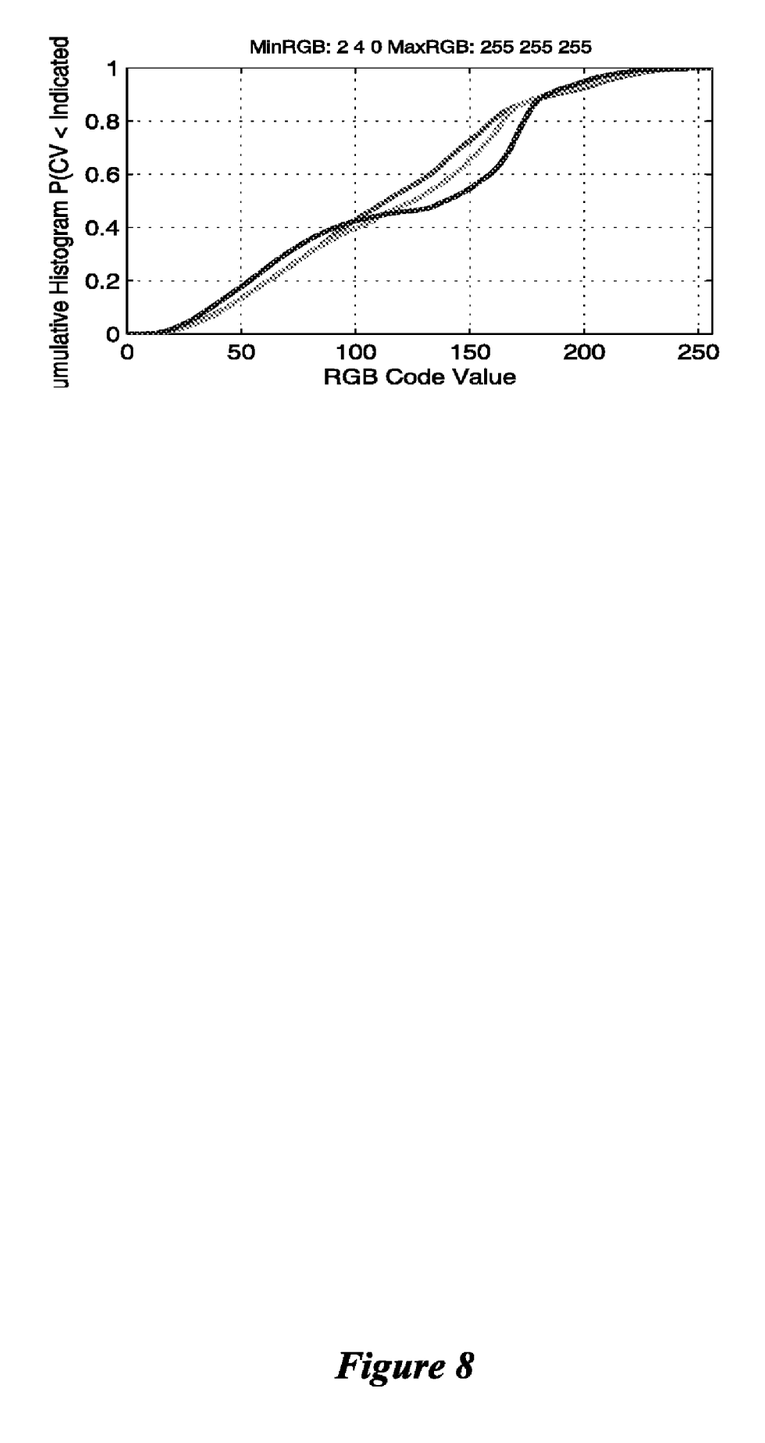
FIG. 8 illustrates graphically spectral frequency data associated with a corrected image of FIG. 7.

Turning to FIG. 8, a representative graph of the cumulative probability distribution associated with the enhanced image of FIG. 7 is illustrated. From the illustration of FIG. 8, it will be appreciated that the cumulative probability distribution function from the histogram of the modified picture appears more analogous to that of a normal, front lit picture as is illustrated in connection with FIGS. 4A and 4B.

The subject application extends to computer programs in the form of source code, object code, code intermediate sources and partially compiled object code, or in any other form suitable for use in the implementation of the subject application. Computer programs are suitably standalone applications, software components, scripts or plug-ins to other applications. Computer programs embedding the subject application are advantageously embodied on a carrier, being any entity or device capable of carrying the computer program: for example, a storage medium such as ROM or RAM, optical recording media such as CD-ROM or magnetic recording media such as floppy discs. The carrier is any transmissible carrier such as an electrical or optical signal conveyed by electrical or optical cable, or by radio or other means. Computer programs are suitably downloaded across the Internet from a server. Computer programs are also capable of being embedded in an integrated circuit. Any and all such embodiments containing code that will cause a computer to perform substantially the subject application principles as described, will fall within the scope of the subject application.

The foregoing description of a preferred embodiment of the subject application has been presented for purposes of illustration and description. It is not intended to be exhaustive or to limit the subject application to the precise form disclosed. Obvious modifications or variations are possible in light of the above teachings. The embodiment was chosen and described to provide the best illustration of the principles of the subject application and its practical application to thereby enable one of ordinary skill in the art to use the subject application in various embodiments and with various modifications as are suited to the particular use contemplated. All such modifications and variations are within the scope of the subject application as determined by the appended claims when interpreted in accordance with the breadth to which they are fairly, legally and equitably entitled.

What is claimed is:

1. A system for predictor-based image enhancement comprising:
  means adapted for receiving image data, the image data including data representative of a backlit image inclusive of at least one specimen area and a backlit background area;
  transition detection means adapted for determining, from received image data, a transition between at least one specimen area and at least one background area in accordance with histogram data and cumulative probability distribution data derived from the received image data;
  adjustment means adapted for adjusting a parameter of image data associated with at least one of the specimen area and the background area in accordance with a determined transition;
  mask generator means adapted for generating mask data corresponding to a transition area between the specimen area and the backlit background area; and
  wherein the adjustment means includes means adapted for selectively adjusting a parameter of image data associated with at least one of the specimen area and the backlit background area in accordance with a determined transition in accordance with the mask data.

2. The system for predictor-based image enhancement of claim 1 wherein the adjustment means includes means adapted for adjusting a lighting level associated with at least one of image data of the specimen area and image data of the backlit background area.

3. The system for predictor-based image enhancement of claim 1 wherein the adjustment means includes means adapted for increasing a lighting level associated with image data of the specimen area and decreasing a lighting level associated with image data of the backlit background area.

4. The system for predictor-based image enhancement of claim 1 further comprising:
   determining means adapted for determining spectral frequency data representative of a spectral frequency distribution of color data included in the image data; and
   wherein the adjustment means includes means adapted for adjusting the lighting level associated with at least one of image data of the specimen area and image data of the backlit background area in accordance with the spectral frequency data.

5. The system for predictor-based image enhancement of claim 4 wherein the spectral frequency data includes distribution data representative of a cumulative probability distribution of intensity values encoded in the image data.

6. The system for predictor-based image enhancement of claim 1 wherein the mask data corresponds to at least one portion of an image represented by the image data, which at least one portion defines a shape having no significant holes or discontinuities.

7. A method for predictor-based image enhancement comprising the steps of:
   receiving image data, the image data including data representative of a backlit image inclusive of at least one specimen area and a backlit background area;
   determining, from received image data, a transition between the at least one specimen area and the at least one background area in accordance with histogram data and cumulative probability distribution data derived from the received image data;
   adjusting a parameter of image data associated with at least one of the specimen area and the background area in accordance with a determined transition;
   generating mask data corresponding to a transition area between the specimen area and the backlit background area; and
   selectively adjusting a parameter of image data associated with at least one of the specimen area and the backlit background area in accordance with a determined transition in accordance with the mask data.

8. The method for predictor-based image enhancement of claim 7 wherein the step of adjusting includes adjusting a lighting level associated with at least one of image data of the specimen area and image data of the backlit background area.

9. The method for predictor-based image enhancement of claim 7 wherein the step of adjusting includes increasing a lighting level associated with image data of the specimen area and decreasing a lighting level associated with image data of the backlit background area.

10. The method for predictor-based image enhancement of claim 8 further comprising the steps of:
    determining spectral frequency data representative of a spectral frequency distribution of color data included in the image data; and
    adjusting the lighting level associated with at least one of image data of the specimen area and image data of the backlit background area in accordance with the spectral frequency data.

11. The method for predictor-based image enhancement of claim 10 wherein the spectral frequency data includes distribution data representative of a cumulative probability distribution of intensity values encoded in the image data.

12. The method for predictor-based image enhancement of claim 7 wherein the mask data corresponds to at least one portion of an image represented by the image data, which at least one portion defines a shape having no significant holes or discontinuities.

13. A computer-implemented method for predictor-based image enhancement comprising the steps of:
    receiving image data, the image data including data representative of a backlit image inclusive of at least one specimen area and a backlit background area;
    determining, from received image data, a transition between the at least one specimen area and the at least one background area in accordance with histogram data and cumulative probability distribution data derived from the received image data;
    adjusting a parameter of image data associated with at least one of the specimen area and the background area in accordance with a determined transition;
    generating mask data corresponding to a transition area between the specimen area and the backlit background area; and
    selectively adjusting a parameter of image data associated with at least one of the specimen area and the backlit background area in accordance with a determined transition in accordance with the mask data.

14. The computer-implemented method for predictor-based image enhancement of claim 13 wherein the step of adjusting includes at least one of adjusting a lighting level associated with at least one of image data of the specimen area and image data of the background area and increasing a lighting level associated with image data of the specimen area and decreasing a lighting level associated with image data of the backlit background area.

15. The computer-implemented method for predictor-based image enhancement of claim 13 further comprising the steps of:
    determining spectral frequency data representative of a spectral frequency distribution of color data included in the image data; and
    adjusting the lighting level associated with at least one of image data of the specimen area and image data of the backlit background area in accordance with the spectral frequency data.

16. The computer-implemented method for predictor-based image enhancement of claim 15 wherein the spectral frequency data includes distribution data representative of a cumulative probability distribution of intensity values encoded in the image data.

17. The computer-implemented method for predictor-based image enhancement of claim 13 wherein the mask data corresponds to at least one portion of an image represented by the image data, which at least one portion defines a shape having no significant holes or discontinuities.

* * * * *

UNITED STATES PATENT AND TRADEMARK OFFICE
CERTIFICATE OF CORRECTION

| | | |
|---|---|---|
| PATENT NO. | : 7,701,618 B2 | Page 1 of 1 |
| APPLICATION NO. | : 11/465588 | |
| DATED | : April 20, 2010 | |
| INVENTOR(S) | : William C. Kress | |

It is certified that error appears in the above-identified patent and that said Letters Patent is hereby corrected as shown below:

In claim 10, Column 9, starting at line 51, please replace the claim as follows:

--10. The method for predictor-based image enhancement of claim 7 wherein the step of adjusting includes increasing a lighting level associated with image data of the specimen area and decreasing a lighting level associated with image data of the backlit background area.--

Signed and Sealed this

Twenty-fifth Day of May, 2010

David J. Kappos
*Director of the United States Patent and Trademark Office*

UNITED STATES PATENT AND TRADEMARK OFFICE
CERTIFICATE OF CORRECTION

PATENT NO. : 7,701,618 B2
APPLICATION NO. : 11/465588
DATED : April 20, 2010
INVENTOR(S) : William C. Kress It is certified that error appears in the above-identified patent and that said Letters Patent is hereby corrected as shown below:

This certificate supersedes the Certificate of Correction issued May 25, 2010. The certificate should be vacated since the claim 10 in the patent was printed in accordance with the record. The claim 10 requested by applicant to be replaced is a duplicate of claim 9 in the printed patent.

Signed and Sealed this

Twentieth Day of July, 2010

David J. Kappos
*Director of the United States Patent and Trademark Office*